United States Patent [19]

Brooks et al.

[11] Patent Number: 4,515,924

[45] Date of Patent: May 7, 1985

[54] INJECTION MOLDABLE AMIDE-IMIDE POLYMERS AND COPOLYMERS CONTAINING SEMI-CRYSTALLINE AND AMORPHOUS POLYAMIDES

[75] Inventors: Gary T. Brooks; Bill W. Cole, both of Naperville, Ill.

[73] Assignee: Standard Oil Company (Indiana), Chicago, Ill.

[21] Appl. No.: 492,398

[22] Filed: May 6, 1983

Related U.S. Application Data

[63] Continuation-in-part of Ser. No. 383,268, May 28, 1982, Pat. No. 4,467,011.

[51] Int. Cl.$^3$ ............................ C08L 77/00; B23B 7/00
[52] U.S. Cl. ..................................... 525/432; 428/260
[58] Field of Search .......................................... 525/432

[56] References Cited

U.S. PATENT DOCUMENTS

| | | | |
|---|---|---|---|
| 3,347,828 | 10/1967 | Stephens | 528/182 |
| 3,573,260 | 3/1971 | Morello | 528/188 |
| 3,592,952 | 7/1971 | Fang | 525/432 |
| 3,661,832 | 5/1972 | Stephens | 528/350 |
| 4,016,140 | 4/1977 | Morello | 528/350 |
| 4,224,214 | 9/1980 | Chen | 524/451 |
| 4,309,528 | 1/1982 | Koske et al. | 528/188 |
| 4,313,868 | 2/1982 | Homson | 528/188 |
| 4,340,697 | 7/1982 | Aya et al. | 525/432 |

Primary Examiner—John C. Bleutge
Assistant Examiner—A. L. Carrillo
Attorney, Agent, or Firm—David E. Boone; William T. McClain; William H. Magidson

[57] ABSTRACT

Flow properties of polyamide-imide polymers are improved by the addition of semi-crystalline nylons or amorphous polyamides. These polymers are useful as engineering resins, laminates, and molded objects.

9 Claims, No Drawings

INJECTION MOLDABLE AMIDE-IMIDE POLYMERS AND COPOLYMERS CONTAINING SEMI-CRYSTALLINE AND AMORPHOUS POLYAMIDES

BACKGROUND OF THE INVENTION

This is a continuation-in-part application of Ser. No. 383,268, filed May 28, 1982, now U.S. Pat. No. 4,467,011, by the same inventors.

Field of the Invention

The field of this invention relates to polyamide-imide polymers containing semi-crystalline and amorphous polyamides and to molding powders and molded articles prepared therefrom.

Background

Amide-imide polymers and copolymers are a relatively new class of organic compounds known for their solubility in nitrogen-containing solvents when in the largely polyamide form. In the past the major application of these amide-imide polymers has been as wire enamels. This is illustrated in U.S. Pat. Nos. 3,661,832 (1972); 3,494,890 (1970) and 3,347,828 (1967). Amide-imide polymers and copolymers have also been found useful for molding applications as shown in U.S. Pat. Nos. 4,016,140 (1977) and 3,573,260 (1971). U.S. Pat. Nos. 4,136,085 (1979); 4,313,868 (1982) and 4,309,528 (1982) are incorporated herein by reference. These polyamides-imides are known for their outstanding mechanical properties, but they are also difficult to process, particularly to injection mold. This difficulty is a consequence of insufficient flow of the polymer. The art has been looking for improvements in the flow and reduction in melt reactivity during fabrication of the polymers, but it is essential that an additive not impair the excellent mechanical and thermal properties of the polyamide-imide polymers and copolymers, particularly the tensile, flexural and heat deflection properties. U.S. Pat. No. 4,340,697 discloses some amorphous polyamides but does not contemplate semi-crystalline polyamides. Japanese Kokai 55-80457, (80) T. Aya, et al., discloses that semi-crystalline polyamides are inoperative as flow improvers. The ideal flow improving agent for these polymers would be one which plasticizes the polymers during injection molding and cross-links the polymers and copolymers during the curing or annealing step so that the plasticizing effect would be neutralized by cross-linking.

The general object of this invention is to provide polyamide-imide polymers and copolymers containing amorphous and semi-crystalline polyamides. A more specific object of this invention is to provide polyamide-imide polymers and copolymers suitable for use as engineering plastics and high pressure laminates particularly for use in injection molding wherein the polymer flow and melt stability are improved by the addition of about 0.1 to about 20 percent by weight of amorphous polyamides and up to 5 percent by weight of semi-crystalline polyamides. It is important that the amide-imide polyamide alloy be solid state polymerized during annealing to build properties, thus the alloy glass transition temperature must exceed the cure temperature employed during solid state polymerization. Other objects appear hereinafter.

I have now found that amide-imide polymers and copolymers obtained by reacting a polycarboxylic acid anhydride with one primary diamine or a mixture of primary diamines containing about 0.1 to about 20 percent of amorphous polyamides and/or up to 5 percent of semi-crystalline polyamides have excellent flow properties and can readily be injection molded to provide engineering plastics with excellent properties but which can be produced or molded at a much faster rate since the polymer flow has been substantially increased when compared to the polymers which do not contain the polyamides. The semi-crystalline nylons can be incorporated about 0.1 to about 5 weight percent of the polyamide-imide. The polyamides improve the flow and melt stability of neat or filled amide-imide polymers and also when glass fibers, glass beads, mineral fillers, graphite fiber or graphite powder are coated with the polyamide, these can more readily be incorporated into a molded amide-imide object. Amorphous polyamides have also been found to aid the manufacture of amide-imide impregnated graphite woven fiber laminates and chopped fiber molding compounds. Suitable amorphous polyamides have both aromatic and aliphatic moieties. Advantageously, the amorphous polyamide comprises recurring units of the following structure:

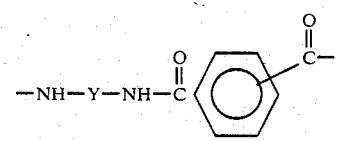

wherein Y is a straight chain of one to six methylene groups, said chain being substituted by at least one alkyl group, the total number of side chain carbon atoms introduced by the alkyl substitution being at least one.

Another amorphous polyamide group suitable for use in improving the melt flow and reducing the melt reactivity of our amide-imide polymer has the following structure:

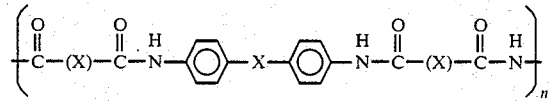

Amorphous polyamides of the following structure are preferred for use in our process, both for flow improvement and for coating the glass fibers, glass beads, mineral fillers or graphite fibers incorporated into a molded polyamide-imide object of this invention.

The amorphous polyamide, Trogamid-T, manufactured by the Dynamit Nobel Company, has the following structure and is particularly useful in improving the flow properties and reducing the melt reactivity of the polyamide-imide:

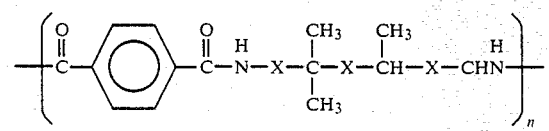

wherein X is $CH_2$.

Another very useful amorphous polyamide is Amidel, manufactured by Union Carbide Company and having the following structure:

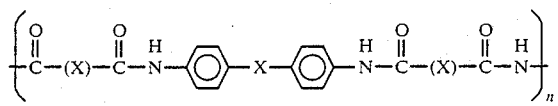

more particularly wherein the first X is $(CH_2)_7$, the second X is $CH_2$ and the third X is $(CH_2)_4$.

Other useful polyamides include the Upjohn amorphous polyamide of the following structure:

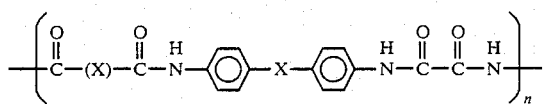

wherein the first X is $(CH_2)_9$ and the second X is $CH_2$, and the copolyamide of the following structure:

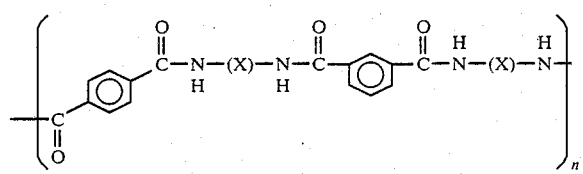

wherein X is $(CH_2)_6$.

In all of the foregoing structures X can be a straight chain of one to five $CH_2$ groups. X can be the same or different in each amorphous polyamide moiety. Some of the semi-crystalline polyamides which increase the amide-imide (A-I) flow properties without significantly altering the glass transition temperature of the polyamide-imides are: nylon 6/6, nylon 6, nylon 6/12, nylon 11, nylon 12, etc.

The amide-imide resins of our invention are very reactive in that the cavity pressure can drop down about 14,000 psi to 0 psi after only a 20 to 30 second increase in cycle time. When about 1 percent, 3 percent, and 5 percent of an amorphous polyamide were dry blended with our glass fiber filled amide-imide polymer, a drastic improvement in melt stability and flow occurred. A 110 percent improvement in flow occurred with the 5 percent amorphous polyamide-imide blend with respect to an amide-imide control sample. The flow improvements are, however, dependent on the starting A-I viscosity. The greater the A-I viscosity, the larger the flow gradient is between the control and the blend. Equally significant is that the amide-imide melt stability is improved when the amorphous polyamide is added, thus the flow increased as the cycle time increased. This is clearly contrary to the behavior of an amide-imide polymer not containing amorphous polyamides.

The amount of the amorphous polyamide added to the amide-imide polymer can be about 0.1 to about 20 weight percent, usually in the range of about 0.1 to about 10 percent. As the percentage of the polyamide increases, the maximum allowable curing temperature is reduced, thus the solid state polymerization time is increased to achieve optimum properties. It has been found that the amorphous polyamide levels below 10 percent allow solid state polymerization at about 500° F. without part distortion. About 0.1 to about 5 weight percent of semi-crystalline nylons are added to the polyamide-imides. Useful semi-crystalline nylons include nylon 6, nylon 6/6, nylon 6/12, nylon 12, and nylon 11. The amorphous polyamide is miscible in our amide-imide polymers, thus forming a single glass transition matrix. When 5 weight percent of the amorphous polyamide such as Trogamid-T was dry blended with our amide-imide polymer (see Example I) and was molded, a single glass transition temperature was found. The glass transition temperature of our amide-imide polymer used as a control was 257° C. as molded while the polymer containing 5 percent by weight of Trogamid-T had a glass transition temperature of about 254° C. After being cured at a temperature of 160° C. to 260° C., the glass transition temperature for our control polyamide-imide polymer rose to 277° C. and for the sample containing 5 percent Trogamid-T rose to 270° C. An increase in glass transition temperature also occurred with amide-imide resin with glass fiber filler. For a 40 percent glass filled resin as given in Example IX, the glass transition temperature increased by 43° F. after solid state polymerization (SSP). This clearly demonstrates that imidization and solid state polymerization occurred during post cure. The amorphous polyamides improved the stability of our amide-imide polymer melt while allowing solid state polymerization during post cure. Thus, with these amorphous polyamides excellent post cure can be carried out and it is during this post cure that the excellent physical and thermal properties of our amide-imide polymer containing amorphous polyamides are obtained.

Amide-imide materials build their properties during the annealing step such that as molded properties are significantly below the annealed properties as illustrated in Table 1 below. To build amide-imide properties, parts are annealed at temperatures up to about 530° F. but preferably 500° F. Since the amorphous polyamides are miscible in the amide-imides, the blend glass transition temperature falls between the two constituents. It is important that the blend glass transition temperature is maintained above the maximum annealing temperature such that optimum properties can be built during annealing. It is also important that the blend glass transition temperature is above the maximum annealing temperatures so that part distortion due to stress relaxation does not occur. The blend glass transition temperature must be equal to or greater than 450° F. so that the amide-imide can be cured. If the blend glass transition temperature falls below 450° F., then post curing of the blend is uneconomical since cure time drastically increases when cure temperatures are reduced.

TABLE 1

|  | As Molded | Annealed at 500° F. |
| --- | --- | --- |
| % Glass Loading | 40 | 40 |
| Injection Molding Temperatures | 315° C. | 315° C. |
| Physical Properties |  |  |
| Tensile Strength (psi) | 13,500 | 33,600 |
| Tensile Elongation (%) | 1.7 | 4.2 |
| Tensile Modulus (psi) | 1,680,000 | 1,820,000 |
| HDT °F. | 479 | 546 |
| Izod Impact ft.-lbs. in. of notch | 0.92 | 1.14 |

After cure a representative 5 percent Trogamid-T neat amide-imide sample had total shrinkage of 8.7 mils per inch, while the control had a shrinkage of 7 mils per inch.

It should be particularly emphasized that when our amides are blended with amorphous polyamides a one-phase miscible amide-imide amorphous polyamide system is obtained. This is critical in the effectiveness of our process and our novel process and novel compositions since if a one-phase miscible system is not formed, delamination of the incompatible components can readily occur with a multiphase polymer system. Equally important, if the polymers are not miscible, the migration or separation of the polymer components can occur especially under the end use A-I conditions.

Amorphous polyamides coated on sized fillers such as glass fibers give better molding characteristics and higher cavity pressures. This allows for higher filler content without restricting the flow. Thus polyamide-imide polymers and copolymers, containing 20 to 60 percent filler can be marketed without loss of the excellent physical properties of our amide-imide polymers. The amorphous polyamide stabilized polymers of this invention are prepared by reacting an acyl halide derivative of an aromatic tricarboxylic-acid-anhydride with one or a mixture of largely- or wholly-aromatic primary diamines. The resulting products are polyamides wherein the linking groups are predominantly amide groups, although some may be imide groups, and wherein the structure contains free carboxylic acid groups which are capable of further reaction. Such polyamides are moderate molecular weight (7-13,000 as prepared) polymeric compounds having in their molecules units of:

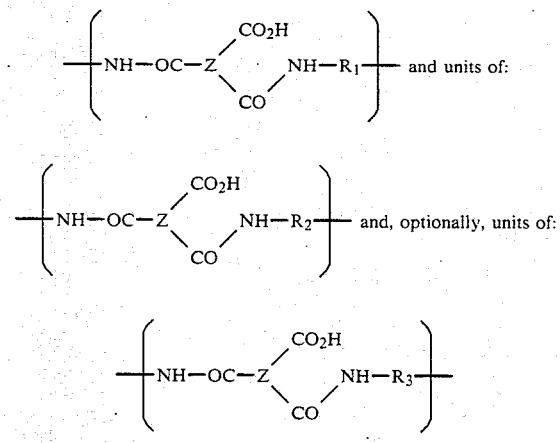

wherein the free carboxyl groups are ortho to one amide group, Z is an aromatic moiety containing 1 to 4 benzene rings or lower-alkyl-substituted benzene rings; $R_1$, $R_2$ and $R_3$ are the same for homopolymers and are different for copolymers and are divalent wholly- or largely-aromatic hydrocarbon radicals. These hydrocarbon radicals may be a divalent aromatic hydrocarbon radical of from about 6 to about 10 carbon atoms, or two divalent aromatic hydrocarbon radicals each of from about 6 to about 10 carbon atoms joined directly or by stable linkages such as —O—, methylene, —CO—, —SO$_2$—, —S—; for example, —R'—O—R'—, —R'—CH$_2$—R'—, —R'—CO—R'—, —R'—SO$_2$—R'— and —R'—S—R'—.

Said polyamides are capable of substantially complete imidization by heating, by which they form the polyamide-imide structure having to a substantial extent reoccurring units of:

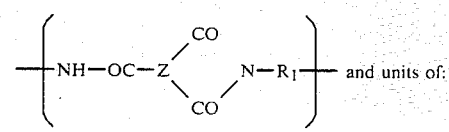

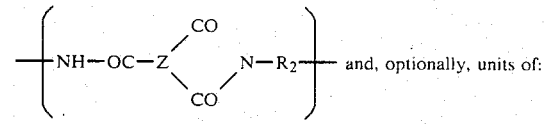

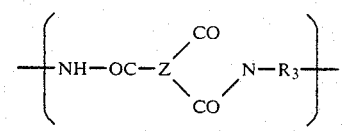

wherein one carbonyl group is meta to and one carbonyl group is para to each amide group and wherein Z, $R_1$, $R_2$ and $R_3$ are defined as above. Typical copolymers of this invention have up to about 50 percent imidization prior to heat treatment, typically about 10 to about 40 percent.

Our process is also useful for improving the flow compositions of polyamide-imide of the foregoing composition wherein between about 20 to 80 percent of imide-containing moieties are replaced by the following composition:

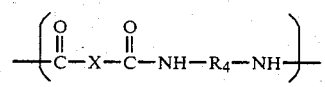

wherein $R_4$ is the same as $R_1$, $R_2$ or $R_3$ and X is a divalent aromatic radical. The preferred composition for X is:

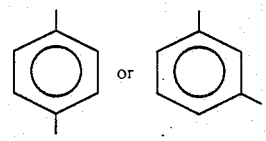

or a mixture of these.

The polyamide-imide copolymers are prepared from an anhydride-containing substance and a mixture of wholly- or partially-aromatic primary diamines or fully- or partially-acylated diamines. The process using acylated diamines is disclosed in U.S. Pat. No. 4,309,528 incorporated herein by reference. Usefully the anhydride-containing substance is an acyl halide derivative of the anhydride of an aromatic tricarboxylic acid which contains 1 to 4 benzene or lower-alkyl-substituted benzene rings and wherein two of the carboxyl groups are ortho to one another. More preferably, the anhydride-containing substance is an acyl halide derivative of an acid anhydride having a single benzene or lower-alkyl-substituted benzene ring, and most preferably, the substance is the acyl chloride derivative of trimellitic acid anhydride (4-TMAC). Up to 80 percent of the dianhydride can be replaced by aromatic diacids such as terephthalic acid or isophthalic acid. The process is disclosed in U.S. Pat. No. 4,313,868, incorporated herein by reference.

We can use a single diamine but usefully the mixture of diamines contains two or more, preferably two or three, wholly- or largely-aromatic primary diamines. More particularly, they are wholly- or largely-aromatic primary diamines containing from about 6 to about 10 carbon atoms or wholly- or largely-aromatic primary diamines composed of two divalent aromatic moieties of from about 6 to about 10 carbon atoms, each moiety containing one primary amine group, and the moieties linked directly or through, for example, a bridging —O—, —S—, —SO$_2$—, —CO—, or methylene group. When three diamines are used they are preferably selected from the class composed of:

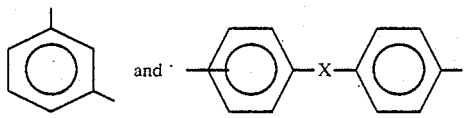

said X being an —O—, —CH$_2$—, or —SO$_2$— group. More preferably, the mixture of aromatic primary diamines is in the one component or two component and is composed of meta-phenylenediamine and p,p'-oxybis(aniline) and meta-phenylenediamine, or p,p'-sulfonylbis(aniline) and p,p'-methylenebis(aniline). Most preferably, the mixture of primary aromatic diamines contains meta-phenylenediamine and p,p'-oxybis(aniline). In the one component system the preferred diamines are oxybis(aniline) or meta-phenylene diamine. The aromatic nature of the diamines provides the excellent thermal properties of the homopolymer copolymers while the primary amine groups permit the desired imide rings and amide linkages to be formed.

Usually the polymerization or copolymerization is carried out in the presence of a nitrogen-containing organic polar solvent such as N-methylpyrrolidone, N,N-dimethylformamide and N,N-dimethylacetamide. The reaction should be carried out under substantially anhydrous conditions and at a temperature below about 150° C. Most advantageously, the reaction is carried out from about 20° C. to about 50° C.

The reaction time is not critical and depends primarily on the reaction temperature. It may vary from about 1 to about 24 hours, with about 2 to 4 hours at about 30° C. to 50° C. preferred for the nitrogen-containing solvents.

Cavity pressure measurements are used as quality control checks of polyamide-imide resin viscosity. Pressure buildup during the filling of an injection molded part is measured at a point in the cavity (ejector pin). This is accomplished by placing a pressure transducer behind the ejector pin and recording the pressure with a chart recorder or other readout device. Cavity pressure normally rises as the mold is being filled and peaks as the molten resin is packed into the cavity. As the resin solidifies, cavity pressure decreases.

We have found that resins that have low cavity pressure process poorly and that spiral flow measurements were not sensitive enough to discriminate between resins in the viscosity range of interest. Low cavity pressures indicate a large pressure drop between injection and cavity pressures. This indicates higher resin viscosities. In the same manner high cavity pressures indicate less pressure change between injection and cavity pressures, suggesting lower resin viscosities.

Amide-imide polymer and copolymer viscosities had been measured by spiral flow determinations previous to the implementation of the cavity pressure procedure, see U.S. Pat. No. 4,224,214. Cavity pressure was selected over spiral flow because of its greater sensitivity. The cavity pressure test has been implemented as an amide-imide homopolymer and copolymer quality control procedure. Like spiral flow, cavity pressure is a test that can be done conveniently in a molder's shop.

The injection molding machine was equipped with a horizontally mounted thermoset screw and barrel assembly. The mold was heated with hot oil from a Mokon Model 105-057 heating unit. Cavity pressure was recorded with a Control Process Model 241 recorder. The mold was equipped to handle pressure transducers at the ejector pins located at the gate end of the tensile bar and the gate end of the flex bar before we began our work. Since it was desirable to make cavity pressure measurements at the dead end of the flex bar, it was necessary to make some modifications in the mold base to accommodate a transducer at this pin position.

Resins were dried in a desiccant hot air circulating oven at 300° F. for at least 16 hours before testing. Moisture in amide-imide homopolymer copolymers has a very significant effect on their flow properties; therefore, special care was taken to be sure the samples were properly dried. This drying procedure was used before making flow rate and cavity pressure measurements.

The flow rate procedure was patterned after the standard method described in ASTM D1238. A 335° C. (635° F.) barrel temperature with a 30 minute preheat time was used. This is about the largest set of weights that can be used safely with the standard extrusion plastometer apparatus. A standard 0.0825 in. diameter, and a 0.315 in. long orifice was used.

Special care was taken to be sure that each flow rate measurement was started when an equivalent volume of resin was in the barrel. Previous rheology work indicated that there is a very large "barrel height" effect on amide-imide homopolymers and copolymers. Each flow rate measurement was initiated while the top of the piston collar was between the two scribe marks on the piston. This precaution is also required by ASTM in method D1238.

Laminates of amide-imide homopolymer and copolymer solution impregnated graphite fiber woven fabric have been produced at lower molding pressures when up to 10 percent by weight of amorphous polyamide is added to the impregnation solution.

The blended solution was used to coat 26"×42" pieces of graphite fiber woven fabric. The fabric was woven from Thornel 300 fiber into an 8 harness satin weave weighing 370 g/m$^2$. Both solution and fabric were preweighed to yield 35 percent dry resin content coated fabric after solvent extraction. The fabric was taped to polyethylene film and the solution was worked into the fabric with a propylene squeegee. The coated fabric was dried at ambient until tack free, then oven dried at 300° F. for 16 hrs. After drying, the fabric was cut to size and loaded in a mold preheated to 650° F. The mold was partially closed on 0.250" shims for 5 minutes to allow additional devolitization while the material and the mold were heated to the 650° F. mold temperature. Full pressure was applied for 5 minutes followed by a double bump (partial opening of mold) to allow venting of entrapped volatile matter. The laminates were then cooled to 450° F. for demolding.

It has been found that the amide-imide homopolymers and copolymers are improved by the addition of semi-crystalline or amorphous polyamides coated or sized reinforcing material; particularly the mechanical properties of the polyimides are improved if these copolyimides contain from about 20 to about 60 percent by weight glass fibers, glass beads, industrial materials such as talc, or graphite or mixtures thereof. In the preferred range the polyimides contain about 30 to about 40 percent by weight of the glass fibers, glass beads, talc or graphite or mixtures thereof. Suitably reinforcing materials can be glass fibers, glass beads, glass spheres, and glass fabrics. The glass fibers are made of alkali-free boron-silicate glass or alkali-containing C-glass. The thickness of the fiber is suitably on the average between 0.003 mm and 0.03 mm. It is possible to use both long fibers with average lengths of from 1.5 to 15 mm and also short fibers of an average filament length from 0.05 mm to 5 mm. In principle, any standard commercial-grade fibers, especially glass fibers, may be used. Glass beads ranging from 0.005 mm to 0.8 mm in diameter may also be used as a reinforcing material.

The reinforced polyamide-imide homopolymers and copolymers may be prepared in various ways. For example, so-called roving endless glass fiber strands are coated with the amorphous polyamides disclosed herein and then are further coated with the polyamic acid melt and subsequently chopped for compression molding. The chopped fibers or the glass beads coated with amorphous polyamides may also be mixed with granulated polyamic acid and the resulting mixture melted in a conventional extruder, or alternatively the fibers coated with amorphous polyamide may be directly introduced into the polyamic acid melt through a suitable inlet in the extruder. Injection molding of the unfilled or glass-filled copolyamide-imides is accomplished by injecting the copolyamide-imides into a mold maintained at a temperature of about 350° F. to 450° F. In this process a 15 to 30-second cycle is used with a barrel temperature of about 580° F. to about 640° F. The injection molding conditions are given in Table 2.

TABLE 2

|  | Set Points |
|---|---|
| Cylinder Temperatures (°F.) | |
| Nozzle | 630 |
| Front Zone | 630 |
| Rear Zone | 620 |
| Timer (seconds) | |
| Clamp Closed (cure) | 18 |
| Injection Hold | 6 |
| Booster (Inj. Hi) | 2 |
| Cycle Delay (open) | 1 |
| High-Low | 2 |
| Injection Pressure (psi) | |
| High | 20,000 |
| Low | 10,000 |
| Machine Settings | |
| Clamp Pressure (tons) | Max. |
| Injection Rate | Max. |
| Screw RPM | 50 |
| Feed Setting | As required |
| Cushion | ¼" |
| Back Pressure (psi) | 220 |
| Mold Temperature (°F.) | |
| Stationary | 450 |
| Movable | 450 |
| Hopper Drier | 220 |

The mechanical properties of the unfilled amide-imide copolymers containing amorphous polyamides (melt compounded) and also the filled amide-imide copolymers are given in Table 3 and it shows that these homopolymers and copolymers have excellent mechanical and thermal properties once solid state polymerized at 500° F. despite the fact that they contain 4 to 5 weight percent of amorphous polyamides.

TABLE 3

|  | Amide-Imide (Example I Preparation) | | | |
|---|---|---|---|---|
| Mineral Fiber Content, % | 0 | 0 | 0 | 0 |
| Glass Fiber Content, % | 0 | 0 | 30 | 30 |
| % Trogamid-T* | 0 | 5 | 0 | 4.3 |
| Annealed Properties | | | | |
| Tensile Strength × $10^3$ psi | 28.9 | 25.4 | 31.0 | 29.9 |
| Tensile Elongation % | 14.2 | 17.1 | 7.45 | 6.84 |
| Flexural Strength × $10^3$ psi | 33.6 | 32.3 | 45.3 | 44.8 |
| Flexural Modulus × $10^6$ psi | .792 | .635 | 1.72 | 1.61 |
| HDT at 264 psi °F. | 534 | 526 | 539 | 526 |
| Izod Impact ft.-lbs./in. of notch | 2.5 | 2.6 | 1.5 | 1.6 |
| Glass Transition Temperature °F. molded | 495 | 478 | — | — |
| annealed | 538 | 527 | 540 | 540 |
| Thermal Aging Tensile Strength × $10^3$ psi | | | | |
| 250 hrs. at 500° F. | 29.2 | 25.0 | — | — |
| 1000 hrs. at 500° F. | 28.0 | 23.1 | — | — |
| Flexural Modulus × $10^6$ psi | | | | |
| 250 hrs. at 500° F. | .761 | .635 | — | — |
| 1000 hrs. at 500° F. | .766 | .659 | — | — |
| Tg °F. | | | | |
| 250 hrs. at 500° F. | 538 | 527 | — | — |
| 1000 hrs. at 500° F. | 554 | 543 | — | — |
| 400° F. Properties | | | | |
| Flexural Strength × $10^3$ psi | — | — | 29.1 | 27.9 |
| % R.T. Retention | — | — | 64 | 62 |
| Flexural Modulus × $10^6$ psi | — | — | 1.38 | 1.34 |
| % R.T. Retention | — | — | 81 | 83 |
| Flow; Cavity Pressure × $10^3$ psi | | | | |
| at 18 seconds | 12.7 | 15.4 | 5.0 | 11.7 |
| at 90 seconds | NR | NR | 0 | 9.5 |
|  | Amide-Imide (Example II Preparation) | | Amide-Imide (Example I Preparation) | |
| Mineral Fiber Content, % | 0 | 0 | 40 | 40 |
| Glass Fiber Content, % | 40 | 40 | 0 | 0 |
| % Trogamid-T* | 0 | 5 | 0 | 5 |
| Annealed Properties | | | | |
| Tensile Strength × $10^3$ psi | 30.6 | 26.2 | 21.2 | 18.0 |
| Tensile Elongation % | 5.7 | 4.8 | 3.7 | 3.5 |
| Flexural Strength × $10^3$ psi | 50.9 | 44.4 | 28.3 | 25.1 |
| Flexural Modulus × $10^6$ psi | 1.95 | 1.83 | 1.51 | 1.43 |

TABLE 3-continued

| | | | | |
|---|---|---|---|---|
| HDT at 264 psi °F. | 560 | 544 | 545 | 510 |
| Izod Impact ft.-lbs./in of notch | 0.95 | 0.86 | 0.75 | 0.73 |
| Tg °F. molded annealed | — | — | — | — |
| | 545 | 536 | 545 | 518 |
| Thermal Aging | | | | |
| Tensile Strength × 10³ psi | | | | |
| 250 hrs. at 500° F. | 32.7 | 28.9 | | |
| 1000 hrs. at 500° F. | 32.5 | 26.4 | | |
| Flexural Modulus × 10⁶ psi | | | | |
| 250 hrs. at 500° F. | 2.05 | 1.88 | | |
| 1000 hrs. at 500° F. | 1.94 | 1.88 | | |
| Tg °F. | | | | |
| 250 hrs. at 500° F. | 554 | 541 | | |
| 1000 hrs. at 500° F. | 554 | 543 | | |
| 400° F. Properties | | | | |
| Flexural Strength × 10³ psi | 36.1 | 31.1 | | |
| % R.T. Retention | 71 | 70 | | |
| Flexural Modulus × 10⁶ psi | 1.72 | 1.59 | | |
| % R.T. Retention | 88 | 87 | | |
| Flow; Cavity Pressure × 10³ psi | | | | |
| at 18 seconds | 13.5 | 19.1 | 0 | 11.4 |
| at 90 seconds | 0 | 20.3 | NR | NR |

*Polymer Weight: Melt compounded with Amide-Imide prior to injection molding.
NR: Not Run.
Glass Fibers: ⅛" PPG 3540.
Mineral Fibers: Wollastokup 1100 0.5.
Samples were cured (solid state polymerized) one day at 320° F., 400° F., 450° F., 475° F. and 3 days at 500° F.

All of the materials studied were molded on the 10 oz. Stokes injection molder under Table I molding conditions unless specified otherwise. A 10 oz. Stokes injection molder is fitted with a 1:1 compression thermoset screw which can hold approximately 365 grams of amide-imide polymer and copolymer (approximately 0.8 lbs.). Since each test tree weighs approximately 23 grams (neat parts) only 1/16th of the complete injection stroke (shot volume) is used during the molding evaluation. Under these conditions (18 second clamp), the total time the polymer is trapped in the barrel is approximately 7.2 minutes (total cycle is 27 seconds). This does not mean that the polymer is in the melt state for the complete 7.2 minutes due to the temperature gradient (front to rear) in the barrel. For a complete material transition (purge) 16–20 shots must be taken before collecting data.

Amide-imide polymer and copolymer flow, under molding conditions, is determined by its cavity pressure which is measured at a point farthest from the sprue. In this test, a pressure transducer is fitted behind a knockout point located behind the flex bar. The higher the cavity pressure, the better the flow thus making for easier mold filling. To determine our amide-imide copolymer melt stability a plot of cavity pressure vs. cycle time is drawn. A stable resin will exhibit good flow characteristics under adverse molding conditions resulting in a melt insensitive to change in cycle time. A reactive polymer will be cycle time dependent in that its viscosity increases with cycle time. This is illustrated by a steep negative cavity pressure slope. Amide-imide polymer and copolymer samples were all dried for approximately 16 hours at 300° F. in a hot air circulating oven containing a suitable desiccant. The amorphous polyamides were dried overnight in a vacuum oven at 230° F. The semicrystalline polyamides were dried at 175° F. in a vacuum oven. Samples were dry blended together and stored under vacuum in sealed containers.

Amide-imide polymer and copolymer samples were cured in a Blue M hot air programmable oven under a 7 day cycle with 1 day at 320° F., 400° F., 450° F., 475° F. and 3 days at 495° F. Several tensile bars were cured under a 7 day cycle with 3 days at 500° F. These parts were measured for shinkage. The 3 percent (total weight) Trogamid-T, Amidel and copolyamide, amide-imide blends were cured at 500° F. and these materials were ASTM tested.

The semi-crystalline nylons or polyamides are also miscible in the amide-imide resins as determined by a single blend glass transition temperature. However, semi-crystalline polyamide loadings of about 5 percent or less were only studied since higher loadings suppress the alloy glass transition temperature to a point where curing is impossible. This clearly illustrates the blending restrictions that the semi-crystalline polyamides have on the amide-imides. For example, the addition of 1 percent semi-crystalline polyamides reduces the amide-imide (Example I preparation with 30 percent glass) glass transition temperature approximately 15±2° F. while a 3 percent loading reduces the glass transition temperature by more than 40° F. For comparative purposes, a 3 percent loading of am amorphous polyamide reduces the amide-imide glass transition temperature less than 10° F. Another variable which further restricts the amide-imide/semi-crystalline polyamide blending window is the effect that moisture has on polyamide glass transition temperature. Nylon 6/6 glass transition temperatures can vary from 176° F. (dry) to 5° F. (saturated) depending on the amount of moisture absorbed by resins. The variation in glass transition temperatures of the semi-crystalline polyamides under environmental extremes (dry vs. saturated) can result in as much as a 16° F. change in the amide-imide blend glass transition temperatures.

Amide-imide alloys must exhibit glass transition temperatures greater than the maximum cure temperature used during solid state polymerization, thus the amide-imide blending window is controlled by the cure temperatures. Amide-imides are usually cured up to temperatures as high as 530° F. but preferably 500° F. Amide-imides can be cured at lower temperatures; however, the time required to reach the optimum properties is significantly enhanced. It is for this reason that the amide-imide/polyamide alloys must have glass transition temperatures equal to or greater than 450° F. since lower glass transition temperatures would result in a blend which would require extensive cure times to build properties, thus making the alloy economically unattractive. Since amide-imide glass transition temperatures vary with monomeric composition, the blending limits will be determined by the amide-imide glass transition temperature, whereby the alloy glass transition temperature must be equal to or greater than 450° F.

The following examples illustrate the preferred embodiment of the invention. It will be understood that the examples are for illustrative purposes only and do not purport to be wholly definitive with respect to conditions or scope of the invention.

EXAMPLE I

A 200 ml. round bottom 4-neck flask, equipped with a nitrogen inlet tube, stirrer, thermometer, and solids addition funnel, was charged with 99.9 parts by weight of (pbw) p,p'-oxybis(aniline) (OBA), 23.1 pbw metaphenylenediamine (MPDA) and 604 pbw N-methylpyrrolidone (NMP). When solution at room temperature (70° F.) was complete, 142.5 pbw 4-trimellitoyl anhydride chloride (4-TMAC), having a percent purity of 99.5 percent +0.5 percent as determined from chloride content and 6.8 pbw of trimellitic acid anhydride (TMA) was added over 2.5 hours while maintaining a solution temperature of between about 77°–95° F. When addition was complete the solution was stirred for 3 hours during which time the solution viscosity increased to a Gardner-Holdt value of Z5+ or about 110 poises.

Solid polymer was obtained by first pouring the viscous solution into twice its volume of distilled water in a Waring blender and then filtering. The filtrate is washed with 5 increments of 3000 pbw each of distilled water to remove hydrogen chloride that had been generated during reaction.

The solid was dried under a vacuum of 20 inches of mercury for 24 hours at 122° F. The above material was heated for 2 hours in an oven set at 450° F. to give the final product.

EXAMPLE II

A 10 gal. glass-lined Pfaudler kettle equipped with a water-cooled jacket and nitrogen inlet was charged with 9.87 lbs of m-phenylenediamine, 0.35 lbs. of trimellitic anhydride and 59.2 lbs. of N-methylpyrrolidone. After solution had occurred under a nitrogen purge, an intimate blend of 9.52 lbs. of 4-trimellitoyl anhydride chloride and 9.17 lbs. of isophthaloyl dichloride was added over 2.5 hrs. keeping the temperature below 35° C. The resulting viscous solution was brought to 50° C. When the Gardner viscosity had reached a Z3 viscosity the solution was precipitated by passage through a Fitzpatrick comminuting mill. The polymer product was washed five times with deionized water followed by air-drying on a filter for 3 days. The product was then brougght to a solids content of 98.3 percent by heating in a forced air oven for 2 hrs. at 470° F.

EXAMPLE III

Metaphenylenediamine (540 g) and acetic acid (900 ml) were placed in a five liter three-necked round bottom flask equipped with mechanical stirrer, pressure equalizing addition funnel and nitrogen sparge tube, and distillation head and condenser. The nitrogen sparge was set at 300 cc/min and 765 g of acetic anhydride were added over 5 min. This was followed by the addition of 415 g of isophthalic acid and 480 g of trimellitic anhydride. The temperature of the bottom half of the spherical heating mantle surrounding the flask was set at 700° F. and the top half of the mantle was heated with a Variac set at 50. After 105 min., 1730 ml of distillate were collected and the polymer had become very viscous. The heat was turned off and the polymer was cooled under nitrogen.

EXAMPLE IV

A 690 gram portion of dimethylacetamide (DMAC) was stirred and cooled to 5° C. with dry nitrogen purging to keep the system dry. An intimate mixture composed of 252.2 grams of 4-TMAC, 119.0 grams of p,p'-methylene-bis(aniline) (MBA), and 120.0 grams of p,p'-oxybis(aniline) was then added to the solvent over a period of 30 minutes. The temperature of the reaction was allowed to rise to 50° C. At that temperature it was controlled by means of an ice bath. An additional 100 grams of DMAC were then added to wash in all solids, and the reaction continued for another 3½ hours at 50° C. The reaction solution was then poured into a large excess of rapidly-agitated water, whereupon precipitation of the copolymer took place. The solids were then washed several times with distilled water and soaked overnight. Finally, the solids were dried at 120° F. A 443 gram yield of the copolymer was obtained.

EXAMPLE V

A solution consisting of 533.3 grams of NMP, 300 grams of DMAC, and 58.0 grams of propylene oxide was stirred and cooled to 8° C. A mixture of 168.5 grams of 4-TMAC, 80.1 grams of OBA, and 79.3 grams of MBA was then added to the solvent over a period of 50 minutes. During this time the reaction was allowed to warm to 36° C. An additional 66.7 grams of NMP were added to wash in all solids, then the reaction mixture was heated to 50° C. and held at that temperature for 3½ hours. The solution was then filtered.

EXAMPLE VI

The general procedure for preparing a copolymer containing three diamines is illustrated by the reaction of OBA, MPDA and MBA and 4-TMAC in DMAC. Thus, a 242.0 gram portion of OBA (1.21 moles), a 130.7 gram portion of MPDA (1.21 moles) and a 239.6 gram portion of MBA (1.21 moles) were dissolved in 3,900 grams DMAC contained in a 6 liter flask equipped with a nitrogen purge, stirrer, addition funnel and thermometer. A 765 gram portion of 4-TMAC (3.63 moles) in flake or lump form was then added to the solution in portions over 90 minutes. The reaction exotherm was allowed to raise the temperature to about 35° C. The reaction temperature was maintained at 33°–38° C. for the remainder of the 4-TMAC addition using cooling water when necessary. After the TMAC addition was completed, any residual TMAC clinging to the addition funnel was completely washed into the reaction solution with 70 grams DMAC. A heating mantle was applied to the reaction flask and the temperature quickly raised (about 20 min.) to 50° C. The reaction solution was stirred at 50° C. for 90 minutes and then the solution precipitated by admixing with water. Prior to precipitation the solution viscosity was about 7.5 stokes (25° C., 20 percent solids). The polymer was precipitated in distilled water in a model D, W. J. Fitzpatrick Company, comminuting machine (Fitz mill). After precipitation the polymer was washed with distilled water to aqueous pH 4 to 5 (3 to 4 hours washing time), then filtered onto large Buchner funnels. The polymer was dried overnight by drawing air through the funnels, then finally dried in an aeromat drier at 30°–35° C. for 12–15 hours.

EXAMPLE VII

A 78 gram amount of the copolymer in powdered form made according to the procedure set forth in Example I was heated at 550° F. for about 1 hour. It was then cooled and charged cold into a mold preheated in the press to about 600° F. to about 650° F. A maximum pressure of 4,200 psi was applied over a 25 minute period and thereafter the mold and contents cooled to 500° F. under a pressure of 2,100 psi and the molded item immediately ejected. A disk measuring 5½ inches in diameter and ⅛ inch thick had been formed.

EXAMPLE VIII

Neat amide-imide polyamide blends can be prepared by physically blending the constituents together, either pellet to pellet, powder to powder, powder to pellet, or pellet to powder with or without a compounding step prior to injection molding. It is preferred that the constituents are melt compounded; however, favorable results can be achieved without melt compounding.

The filled amide-imide amorphous polyamide blends can be prepared as described above or the polyamide can be dissolved in a solvent and spray coated or dip coated on the filler and/or reinforcement (graphite, fibers, glass fibers, and mineral fillers). Trogamid-T is readily soluble in N-methyl-2-pyrrolidone (NMP). Thus a solution of about 1 to 5 percent Trogamid-T by weight of total solution can be coated on the reinforcement and/or filler. Table 4 compares 40 percent glass-filled amide-imides (Example II) which have been dry blended and melt compounded with an amorphous polyamide.

TABLE 4

| | | |
|---|---|---|
| Glass Content, % | 40 | 40 |
| Blend Procedure | dry | melt |
| % Amorphous Polyamide (Polymer Wgt.) | 5 | 5 |
| Physical Properties* | | |
| Tensile Strength × 10³ (psi) | 27.0 | 26.2 |
| Tensile Elongation % | 5.0 | 4.8 |
| Flexural Strength × 10³ (psi) | 43.1 | 44.4 |
| Flexural Modulus × 10⁶ (psi) | 1.86 | 1.83 |
| HDT (°F.) | 538 | 544 |
| Izod Impact (ft.-lb./ 1.0 in. of notch) | | 0.86 |

*Annealed

EXAMPLE IX

An amide-imide resin (Example II preparation) was dry blended with 40 percent glass fibers from Pittsburg Plate Glass Corporation, identified as PPG 3540, and 1 percent PTFE and then melt compounded. This sample was dry blended with 1 to 5 percent by total weight of an amorphous polyamide (Trogamid-T) or 1.67 to 8.33 percent by weight of the amide-imide polymer weight and injection molded. Parts were annealed on a 7-day cycle, 320° F., 400° F., 450° F., 475° F., and 3 days at 495° F. Physical properties, molded part physical properties, and molded part shinkage are given in Table 5 below.

TABLE 5

| | ASTM Method | | |
|---|---|---|---|
| Glass Content, % | | 40 | 40 |
| Amorphous Polyamide Content, % | | 0 | 1 |
| Part I.V. dl/g | | 0.30 | 0.30 |
| Thermal Properties | | | |
| Glass Transition Temperature (Tg), °F. | | | |
| As Molded | | 505 | 493 |
| Annealed* | | 532 | 525 |
| Annealed Tg Increase | | 27 | 32 |
| Physical Properties* | | | |
| HDT, °F. | D-48 | 549 | 540 |
| Tensile Strength, psi | D-1708 | 20,400 | 23,600 |
| Tensile Elongation, % | D-1708 | 5.6 | 6.8 |
| Flexural Modulus, psi | D-790 | 1,970,000 | 1,930,000 |
| Flexural Strength, psi | D-790 | 45,000 | 46,600 |
| Izod, ft.-lbs./in. of notch | D-256 | 0.89 | 0.86 |
| Molding Results | | | |
| Total Shrinkage (mils/in.) | | 0.7 | 0.7 |
| Cavity Pressure, psi | | 10,300 | 12,600 |
| Glass Content, % | | 40 | 40 |
| Amorphous Polyamide Content, % | | 3 | 5 |
| Part I.V. dl/g | | 0.30 | 0.32 |
| Thermal Properties | | | |
| Glass Transition Temperature (Tg), °F. | | | |
| As Molded | | 480 | 466 |
| Annealed* | | 523 | 509 |
| Annealed Tg Increase | | 43 | 43 |
| Physical Properties* | | | |
| HDT, °F. | | 533 | 524 |
| Tensile Strength, psi | | 20,800 | 18,500 |
| Tensile Elongation, % | | 6.7 | 5.6 |
| Flexural Modulus, psi | | 1,850,000 | 1,730,000 |
| Flexural Strength, psi | | 41,700 | 35,800 |
| Izod, ft-lbs/in of notch | | 0.88 | 0.84 |
| Molding Results | | | |
| Total Shrinkage (mils/in) | | 1.0 | 1.3 |
| Cavity Pressure, psi | | 16,800 | 21,500 |

*Cure cycle days at 320° F., 400° F., 450° F., 475° F., and 3 days at 495° F.

EXAMPLE X

An amide-imide (Example II preparation) resin was dry blended with 40 percent PPG 3540 glass fibers and 1 percent PTFE and melt compounded. The sample was dry blended with 3 percent by total weight of Trogamid-T, Amidel, or copolyamide. Parts were annealed on a 7-day cycle with 3 days at 500° F. Physical properties, flow, and shrinkage dates are shown below in Table 6.

TABLE 6

| Amide-Imide (Example II Preparation) | | | | |
|---|---|---|---|---|
| Amorphous Polyamide Content | Control | Troga-mid-T | Amidel | Copoly-amide |
| Total weight basis, % | 0 | 3 | 3 | 3 |
| A-I Polymer weight basis, % | 0 | 5 | 5 | 5 |
| Cavity Pressure, psi | 10,300 | 16,900 | 21,100 | 18,800 |
| Total Shrinkage, mils/inch | 0.7 | 1.7 | 1.7 | 1.7 |
| Physical Properties* | | | | |
| Tensile Strength, psi | 30,500 | 27,000 | 25,700 | 24,100 |
| Tensile Elongation, % | 5.5 | 5.0 | 4.3 | 4.2 |
| Flexural Strength, psi | 50,900 | 43,100 | 44,100 | 43,200 |
| Flexural Modulus, psi | 1,960,000 | 1,860,000 | 1,750,000 | 1,850,000 |
| HDT, °F. | 555 | 538 | 519 | 518 |
| Izod Impact, Ft-lbs/in. notch | 0.9 | 1.0 | 0.9 | 0.9 |
| Annealed Tg, °F. | 532 | 520 | 523 | 523 |

*Cure Cycle: 1 day at 320° F., 400° F., 450° F., 475° F.; 3 days at 500° F.

EXAMPLE XI

An amide-imide resin prepared as in Example I which was melt compounded with 0.5 percent PTFE or 30 percent PPG 3540 glass fibers and 1 percent PTFE and pelletized. These materials were dry blended with an amorphous polyamide (Trogamid-T). The parts injection molded from these materials were annealed under a 7-day cycle with 3 days at 500° F. Physical properties, flow, and shrinkage data are given in Table 7 below. FIG. 4 illustrates the difference in flow and melt stability with Trogamid-T added to the 30 percent glass filled amide-imide resin. FIG. 5 illustrates the difference in flow and melt stability with Trogamid-T added to an amide-imide resin without glass fiber filler.

TABLE 7

|  |  | Amide-Imide (Example I) | | | |
|---|---|---|---|---|---|
| Glass Content, % | | 30 | 30 | 0 | 0 |
| Amorphous Polyamide Content | | | | | |
| Total Weight Basis, % | | 0 | 5.00 | 0 | 5 |
| Amide-Imide Weight Basis, % | | 0 | 7.14 | 0 | 5 |
| Cavity Pressure, psi | | 8,800 | 15,500 | 14,500 | 16,400 |
| Total Shrinkage, (mils/in) | | 0.7 | 4.4 | 7.0 | 8.7 |
| Physical Properties* | ASTM Method | | | | |
| Tensile Strength, psi | D-1708 | 31,200 | 25,300 | 28,400 | 27,200 |
| Tensile Elongation, % | D-1708 | 7.6 | 7.5 | 15.4 | 16.6 |
| Flexural Modulus, psi | D-790 | 1,790,000 | 1,490,000 | 710,000 | 680,000 |
| Flexural Strength, psi | D-790 | 47,100 | 42,600 | 33,600 | 32,300 |
| Izod, ft-lbs/in of notch | D-256 | 1.61 | 1.77 | 2.45 | 2.71 |
| Thermal Properties | | | | | |
| Tg, as molded, °F. | | 502 | 464 | 495 | 481 |
| Tg, annealed, °F. | | 540 | 507 | 531 | 523 |
| HDT, °F. | D-48 | 513 | 515 | 535 | 535 |

*7-Day Cure Cycle: 1 day at 320° F., 400° F., 450° F., 475° F.; 3 days at 500° F.

EXAMPLE XII

An amide-imide (Example III preparation) resin which contained 40 percent milled glass and 1 percent PTFE was melt compounded and dry blended with 5 percent by weight of Trogamid-T. Parts were molded with and without Trogamid-T. The control (no Trogamid-T) was so viscous that it stalled the injection molder screw during reciprocation, thus, the run was aborted to prevent the screw from seizing. When 5 percent (total weight) Trogamid-T was dry blended into this material, a cavity pressure of 12,000 psi was obtained. The melt reactivity during plastication was inhibited.

EXAMPLE XIII

The amide-imides had cavity pressures ranging from 1,500 psi to 14,000 psi. The higher the cavity pressure the less viscous the polymer. Over this amide-imide cavity pressure range a −0.96 correlation coefficient is established for amide-imides as prepared in Example I. As the amide-imide cavity pressure increases, the percent increase in blend flow decreases. For example, a 12,000 psi cavity pressure A-I resin can expect a 20 percent increase in flow, when 5 percent by polymer weight of an amorphous polyamide is added, while a 6,000 psi cavity pressure A-I resin can expect a 100 percent increase in flow.

EXAMPLE XIV

To determine the melt reactivity of the polyamide-imide/amorphous polyamide blends, Example I prepared polyamide-imide was blended with 1 percent, 3 percent, 5 percent, 7 percent, 10 percent and 15 percent by weight of Trogamid-T powder. Each blend was homogenized in the Brabender measuring head for up to 20 minutes and torque was measured as a function of mixing time. Samples were collected at various mixing intervals and submitted for I.V.'s and glass transition temperatures to determine if the amide-imide is being melt cured. The polyamide-imide glass transition temperature increased to 525° F. after 15 minutes of mixing while the material was nearly insoluble in NMP (N-methyl-2-pyrrolidone) thus indicating the polyamide-imide being melt cured in the Brabender measuring head.

It was found that as the level of Trogamid-T increased, the polyamide-imide torque decreased. The polyamide-imide alloy also showed a steady increase in torque with mixing time, similar to the amide-imide control. This may explain why these alloys can be solid state polymerized during annealing.

EXAMPLE XV

The blend glass transition temperatures in Example XIV are reported in the below table. These samples were collected after six minutes of mixing. The mixing time is a critical parameter in this study since the polyamide-imide glass transition temperatures change with heat treating. The results in the below table also indicate that Couchman-Karasz equation (C-K) can reliably predict the alloy glass transition temperatures at levels as high as 15 percent by weight of the amorphous polyamide.

It is clear to see that the addition of an amorphous polyamide suppresses the glass transition temperature of polyamide-imides.

TABLE

| % Poly-amide-imide | % Amorphous Polyamide | Tg °K. Uncured Experimental* | C-K Predicted |
|---|---|---|---|
| 100 | 0 | 534.1 | — |
| 99 | 1 | 533.8 | 532.5 |
| 97 | 3 | 529.9 | 529.3 |
| 95 | 5 | 528.9 | 526.3 |
| 93 | 7 | 521.9 | 523.3 |
| 90 | 10 | 518.8 | 519.0 |
| 85 | 15 | 513.6 | 512.0 |

*DSC, average of two determinations.

EXAMPLE XVI

The effectiveness of the polyamide on the polyamide-imide flow properties is dependent on the viscosity of the polyamide-imide resins. The polyamide-imides in Examples I and II have different temperature/flow responses as illustrated by their activation energies. Example II polyamide-imide activation energy is twice that of Example I prepared polyamide-imide, thus the latter is less temperature sensitive. At temperatures below about 640° F., the amorphous polyamides are more effective in Example II prepared polyamide-imides. Above 640° F., the amorphous polyamide is more effective in Example I prepared polyamide-imides. Overall, the effectiveness of the polyamides is dependent on the polyamide-imide viscosity and the temperature/flow response of the polyamide-imide resins.

EXAMPLE XVII

The effect of an amorphous polyamide on the flow characteristics of Example I and II prepared polyamide-imides is illustrated below under various processing temperatures. Both polyamide-imide materials are glass fiber filled and have 3 percent by polymer weight of Trogamid-T added.

|  | Front Zone Temperature | |
|---|---|---|
|  | 575° F. | 630° F. |
| Cavity pressure (flow) psi | | |
| Example I prepared A-I | | |
| Control | 6,000 | 8,300 |
| 3% Trogamid-T | 6,000 | 12,400 |
| Example II prepared A-I | | |
| Control | 0 | 9,000 |
| 3% Trogamid-T | 0 | 17,300 |
|  | 675° F. | 700° F. |
| Cavity pressure (flow) psi | | |
| Example I prepared A-I | | |
| Control | 10,700 | 9,000 |
| 3% Trogamid-T | 17,900 | 18,800 |
|  | 650° F. | 675° F. |
| Example II prepared A-I | | |
| Control | 18,000 | 20,700 |
| 3% Trogamid-T | 21,100 | N.R. |

It is clear that the addition of the amorphous polyamide has a different effect on the flow response of these polyamide-imides under the temperature study. This example also demonstrates that the amorphous polyamide effectiveness is dependent on the processing temperatures used during molding. The data also illustrates that the flow response of the alloy is dependent on the polyamide-imide material used and that not all polyamide-imides behave alike.

EXAMPLE XVIII

An amide-imide resin (Example I preparation) was dry blended with 40 percent glass fibers from Pittsburg Plate Glass Corporation, identified as PPG 3546, and 1 percent PTFE and then melt compounded. This sample was dry blended with 1 to 3 percent by total weight of various semi-crystalline polyamides (nylon 6, nylon 6/6, nylon 6/12, nylon 12, nylon 11) and injection molded. Parts were annealed on a 7-day cycle, one day at 320° F., 400° F., 450° F., 475° F. and three days at 500° F. Physical properties, molded part physical properties, molded part shrinkage and flow data are given in Table 8. Table 8 also illustrates the importance of solid state polymerization of the molded amide-imide/polyamide parts.

TABLE 8

| | | | | | | | | |
|---|---|---|---|---|---|---|---|---|
| Glass Content, % | 30% | 30% | 30% | 30% | 30% | 30% | 30% | 30% |
| Blend Procedure | — | Dry | Dry | Dry | Dry | Dry | Dry | Dry |
| % Polyamide | — | 3% Trog.-T | 1% Trog.-T | 1% Nylon 6 | 1% Nylon 6/6 | 1% Nylon 6/12 | 1% Nylon 12 | 1% Nylon 11 |
| Cavity Pressure × 10³ psi | | | | | | | | |
| @ 18 second cycle | 12.5 | 16.0 | 14.2 | 15.8 | 14.8 | 14.8 | 15.1 | 13.9 |
| @ 90 second cycle | 0 | 15.7 | 5.1 | 14.2 | 2.0 | 2.0 | 3.0 | NR |
| Total Shrinkage mils per/inch | 1.4 | 4.0 | 2.3 | 3.4 | 3.0 | 3.4 | 3.4 | 3.7 |
| Thermal Properties | | | | | | | | |
| Tg, °F. | | | | | | | | |
| molded | 495 | 477 | 480 | 469 | 480 | 478 | 475 | 482 |
| cured | 540 | 532 | 534 | 523 | — | 523 | 527 | 527 |
| HDT °F. | | | | | | | | |
| molded | 479 | 459 | — | 458 | 460 | 460 | 464 | 467 |
| cured | 543 | 525 | 530 | 520 | 535 | 529 | 529 | 529 |
| Physical Properties | | | | | | | | |
| Tensile Strength × 10³ psi | | | | | | | | |
| molded | 19.3 | 11.0 | 19.7 | 14.8 | 16.0 | 18.7 | 18.8 | 18.2 |
| cured | 26.7 | 25.9 | 30.2 | 26.7 | 27.9 | 28.8 | 28.8 | 28.8 |
| Tensile Elongation % | | | | | | | | |
| molded | 4.8 | 2.0 | 4.7 | 2.9 | 5.1 | 4.7 | 4.7 | 4.5 |

TABLE 8-continued

| | | | | | | | | |
|---|---|---|---|---|---|---|---|---|
| cured | 6.9 | 6.9 | 8.2 | 5.8 | 9.5 | 7.4 | 7.8 | 7.3 |
| Flexural Strength × 10³ psi | | | | | | | | |
| molded | 32.3 | 29.0 | 32.0 | 30.7 | 30.2 | 30.0 | 29.1 | 30.4 |
| cured | 46.4 | 42.1 | 45.1 | 44.6 | 44.1 | 43.1 | 43.7 | 44.1 |
| Flexural Modulus × 10⁶ psi | | | | | | | | |
| molded | 1.66 | 1.55 | 1.67 | 1.58 | 1.59 | 1.55 | 1.55 | 1.54 |
| cured | 1.57 | 1.47 | 1.63 | 1.51 | 1.50 | 1.47 | 1.47 | 1.50 |
| Izod Impact, Notched (Ft.-lbs./in. of notch) | | | | | | | | |
| molded | 1.0 | 1.0 | — | 1.1 | 1.1 | 1.1 | 1.1 | 1.2 |
| cured | 1.6 | 1.8 | 1.6 | 1.7 | 1.8 | 1.8 | 1.7 | 1.9 |

EXAMPLE XIX

An amide-imide resin (Example II prepared) was dry blended with 40 percent glass fibers (PPG-3540) and 1 percent polytetrafluroethylene (PTFE) and then melt compounded. This sample was dry blended with 1 to 3 percent by total weight of various semi-crystalline polyamides and injection molded. Parts were annealed on a 7-day cycle, one day at 320° F., 400° F., 450° F., 475° F. and three days at 500° F. Physical property, flow and shrinkage data are given in Table 9.

TABLE 9

| | | | | | |
|---|---|---|---|---|---|
| % Glass | 40% | 40% | 40% | 40% | 40% |
| Blend Procedure | — | Dry | Dry | Dry | Dry |
| % Polyamide | — | 3% Troga-mid-T | 1% Nylon 6 | 3% Nylon 6 | 3% 6/6 |
| Cavity Pressure × 10³ psi | | | | | |
| @18 seconds cycle | 12.5 | 16.8 | 19.0 | 21.0 | 19.4 |
| @90 seconds cycle | 0 | 19.6 | 20.8 | 21.3 | 21.9 |
| Total Shrinkage mils per/inch | 0.7 | 1.7 | — | — | — |
| Physical Properties (Cured) | | | | | |
| Tensile Strength × 10³ psi | 30.5 | 27.0 | 25.1 | NR | NR |
| Tensile Elongation % | 5.5 | 5.0 | 5.9 | NR | NR |
| Flexural Strength × 10³ psi | 50.9 | 43.1 | 48.7 | NR | NR |
| Flexural Modulus × 10⁶ psi | 1.96 | 1.86 | 1.83 | NR | NR |
| Izod Impact, Notched ft. lbs./in. of notch | 0.9 | 1.0 | 1.0 | NR | NR |
| Thermal Properties HDT, °F. | 555 | 538 | 546 | NR | NR |

NR: Not run, bars distorted during cure, samples could be cured at lower temperatures.

EXAMPLE XX

A neat amide-imide (Example I preparation) was melt compounded with 5 percent and 20 percent by weight of Trogamid-T. Parts were molded on the 10 oz. Stokes injection molder at about 630° F. The 5 percent Trogamid-T amide-imide material and the control were annealed at 500° F. for 3 days prior to testing. The 20 percent Trogamid-T amide-imide blend parts distorted during the 500° F. annealing processing, thus, properties were not measured. At the 20 percent Trogamid-T loading the as molded amide-imide part glass transition temperature was 410° F. (210° C.) and after annealing it rose 40° F. to 450° F. (232° C.). The 20 percent Trogamid-T amide-imide blend maximum glass transition temperature was 450° F., some 50° F. below the maximum annealing temperature, thus exemplifying the distortion during annealing due to stress relaxation of the part. The amide-imide controls as molded and annealed glass transition temperatures were 495° F. and 531° F. while the 5 percent Trogamid-T amide-imide blend had as molded and annealed glass transition temperatures of 489° F. and 523° F.

EXAMPLE XXI

N-methyl-2-pyrrolidone (NMP) is a solvent for both polymers of interest-polyamide-imide and Trogamid-T. A 27.5 percent solids solution of Trogamid-T in NMP was prepared as follows. The NMP (725 grams) was heated to 180° F., and stirred with a high shear blade mixer with sufficient speed to keep the Trogamid-T pellets from agglomerating when added to the solvent. The Trogamid-T pellets were added to the hot solvent over a 20-minute period. After ≈ 1½ hours mixing, all pellets were dissolved. Mixing was continued for 2 hours after all pellets appeared to be dissolved. The solution was allowed to cool and sit 16 hours before using.

The Trogamid-T solution described above was blended with a polyamide-imide/NMP solution (27.5 percent solids) at a 95:5 weight ratio. The polyamide-imide solution was first heated to 150° F. The Trogamid solution was then added, and the blend was stirred with a high shear mixer for four hours. The blended solution was allowed to cool and sit 16 hours before using.

The blended solutions of polyamide-imide/Trogamid-T were used to coat graphite fiber woven fabric. The laminates formed from these blends and a control are listed in the Table below.

TABLE 10

| Sample | Molded Pressure, psi | Short Beam Shear (SBS), ksi |
|---|---|---|
| Control | 3000–4000 | 10–11 |
| 82-01-13-01 | 2000 | 11.45 |
| 82-01-13-02 | 1500 | 11.69 |
| 82-01-14-01 | 1000 | 11.50 |

Laminates using 100 percent polyamide-imide require molding pressures of 3000 to 4000 psi to obtain void free parts with good surface appearance. Laminates utilizing the polyamide-imide/Trogamid-T blend were molded at pressures of 2000, 1500, and 1000 psi:mold pressure, respectively. A good quality laminate will have short beam shear (SBS) strength of 10–11 ksi as molded. The blend laminates have SBS strengths above 11 ksi.

We claim:
1. A composition of matter which comprises (A) an injection moldable copolymer comprising units of:

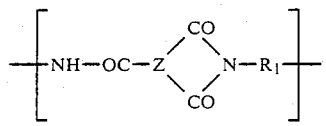

and units of:

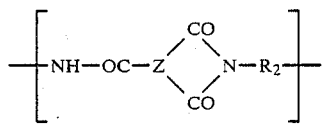

wherein one carbonyl group of the injection moldable copolymer is meta to and one carbonyl group of the injection moldable copolymer is para to each amide group and wherein Z is a trivalent benzene ring or lower-alkyl-substituted trivalent benzene ring, $R_1$ and $R_2$ are different and are divalent aromatic hydrocarbon radicals of from about 6 to about 10 carbon atoms or two divalent aromatic hydrocarbon radicals of from about 6 to about 10 carbon atoms joined directly or by stable linkages selected from the group consisting of —O—, methylene, —CO—, —SO$_2$—, and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit; and (B) about 0.1 to about 5 percent by weight of a polyamide selected from the group consisting of nylon 6, nylon 6/6, nylon 6/12, nylon 11 and nylon 12.

2. The copolymer of claim 1 wherein $R_1$ is

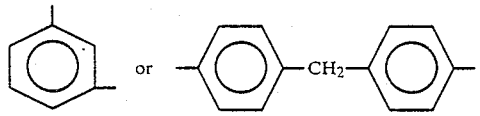

and $R_2$ is

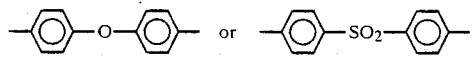

or wherein $R_1$ is

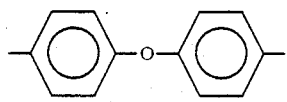

and $R_2$ is

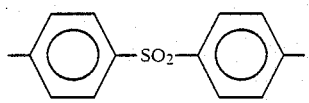

3. The polymer of claim 2 wherein the nylon is nylon 6.

4. The polymer of claim 2 wherein the nylon is nylon 6/6.

5. The polymer of claim 2 wherein the nylon is nylon 6/12.

6. The polymer of claim 2 wherein the nylon is nylon 12.

7. The polymer of claim 2 wherein the nylon is nylon 11.

8. The copolymer of claim 1 wherein Z is a trivalent benzene ring, $R_1$ is

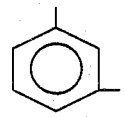

and $R_2$ is

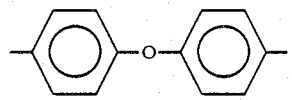

and wherein the concentration range runs from about 30 mole percent of the $R_1$ containing units and about 70 mole percent of the $R_2$ containing units to about 70 mole percent of the $R_1$ containing units and about 30 mole percent of the $R_2$ containing units.

9. The copolymer of claim 2 wherein Z is a trivalent benzene ring, $R_1$ is

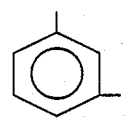

and $R_2$ is

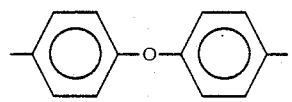

* * * * *

UNITED STATES PATENT OFFICE
CERTIFICATE OF CORRECTION

Patent No. 4,515,924           Dated May 7, 1985

Inventor(s) Brooks, Gary T. and Cole, Bill W.

It is certified that error appears in the above-identified patent and that said Letters Patent are hereby corrected as shown below:

Column 1, line 31, "polyamides-imides" should be --polyamide-imides--.

Column 4, lines 62-63, "Izod Impact ft.-lbs." should be
                                    in of notch"

--Izod Impact $\frac{\text{ft.-lbs.}}{\text{in. of notch}}$--.

Column 5, line 58, "b 6" should be --6--.

Column 5, line 60, "b 10" should be --10--.

Column 5, lines 67-68, "reoccurring" should be --recurring--.

Column 7, line 33, "meta-phenylene diamine" should be --meta-phenylenediamine--.

Column 7, line 20, "  " should be

--  --.

Column 9, line 42, "15" should be -- 15- --.

Column 12, line 8, "shinkage" should be --shrinkage--.

Column 12, line 26, "am" should be --an--.

Column 12, line 60, "exampls" should be --examples--.

Column 13, line 5, "+0.5" should be --$\pm$0.5--.

UNITED STATES PATENT OFFICE
CERTIFICATE OF CORRECTION

Patent No. 4,515,924            Dated May 7, 1985

Inventor(s) Brooks, Gary T. and Cole, Bill W.

It is certified that error appears in the above-identified patent and that said Letters Patent are hereby corrected as shown below:

Column 13, line 39, "brougght" should be --brought--.

Column 15, line 33, "ft.-lb/1.0    0.86" should be --ft.-lb./1.0    0.86--.

Column 15, line 49, "shinkage" should be --shrinkage--.

Column 17, line 3, "Example I which" should be --Example I--.

Column 19, line 57, "per/" should be --/--.

Column 21, line 17, "polytetrafluroethylene" should be --polytetrafluoroethylene--.

Column 21, line 27, "Troga-    Nylon Nylon" should be --Troga-Nylon    Nylon    Nylon--.

Column 21, line 28, "Nylon" should be deleted.

Column 21, line 35, "per/" should be --/--.

UNITED STATES PATENT OFFICE
CERTIFICATE OF CORRECTION

Patent No. 4,515,924   Dated May 7, 1985

Inventor(s) Brooks, Gary T. and Cole, Bill W.

It is certified that error appears in the above-identified patent and that said Letters Patent are hereby corrected as shown below:

Column 22, line 26, "interest-polyamide-imide" should be --interest, polyamide-imide--.

Column 22, line 62, "psi: mold pressure" should be --psi mold pressure--.

Signed and Sealed this

Twenty-eighth Day of January 1986

[SEAL]

Attest:

DONALD J. QUIGG

Attesting Officer   Commissioner of Patents and Trademarks